United States Patent [19]

Matsuzaki

[11] Patent Number: 5,706,917
[45] Date of Patent: Jan. 13, 1998

[54] DISC BRAKE HAVING A SHIM ENGAGED BETWEEN A PISTON AND A FRICTION PAD FOR RETRACTING THE FRICTION PAD UPON RETRACTION OF THE PISTON

[75] Inventor: Yoshiki Matsuzaki, Itami, Japan

[73] Assignee: Sumitomo Electric Industries, Ltd., Osaka, Japan

[21] Appl. No.: 658,674

[22] Filed: Jun. 4, 1996

[30] Foreign Application Priority Data

Jun. 5, 1995 [JP] Japan .................. 7-137973
May 10, 1996 [JP] Japan .................. 8-115951

[51] Int. Cl.[6] .................................................. F16D 65/02
[52] U.S. Cl. .................................. 188/73.38; 188/73.35; 188/250 D; 188/250 E
[58] Field of Search ..................... 188/73.31, 73.32, 188/73.35, 73.36, 73.37, 73.38, 73.44, 73.45, 250 E, 250 B

[56] References Cited

U.S. PATENT DOCUMENTS

| | | | |
|---|---|---|---|
| 4,196,794 | 4/1980 | Matjumoto | 188/73.38 |
| 4,424,886 | 1/1984 | Frigger et al. | 188/73.45 |
| 5,509,508 | 4/1996 | Evans | 188/73.38 |
| 5,538,105 | 7/1996 | Rike | 188/73.31 |

FOREIGN PATENT DOCUMENTS

| | | | |
|---|---|---|---|
| 2536619 | 2/1977 | Germany | 188/73.38 |
| 40 20 077 | 1/1992 | Germany. | |
| 2022733 | 12/1979 | United Kingdom | 188/73.37 |
| 2 178 807 | 2/1987 | United Kingdom. | |

*Primary Examiner*—Matthew C. Graham
*Attorney, Agent, or Firm*—Wenderoth, Lind & Ponack

[57] ABSTRACT

An open-top disc brake can prevent brake pads from being dragged by a piston while the brake is not applied by causing the pads to follow the piston, and permits easy replacement of the pads. Shims are provided between the pads and the pistons. The shims have first claws engaged with grooves formed in the pistons, and second claws engaged with the front face of a backing plate of each pad. The second claws comprise claws that engage both ends of the pad with respect to the tangential direction of the disc, and claws that engage the edge of the pad on the radially inner side of the disc. The piston retracting force imparted to each piston by its piston seal is transmitted to the pad through the shim, so that the pad is separated substantially entirely from the disc.

18 Claims, 5 Drawing Sheets

DISC BRAKE HAVING A SHIM ENGAGED BETWEEN A PISTON AND A FRICTION PAD FOR RETRACTING THE FRICTION PAD UPON RETRACTION OF THE PISTON

BACKGROUND OF THE INVENTION

This invention relates to an open-top type disc brake having a means for retracting its friction pads so as to follow its pistons when the braking pressure is removed so as to positively prevent the friction pads from being dragged by the disc while the brake is not applied.

An open-top disc brake has its friction pads (hereinafter simply referred to as "pads") hung from pad pins extending laterally in an opening formed in the caliper by passing the pad pins through pin holes formed in backing plates of the pads so that the pads are slidable in the axial direction of the disc. By pulling out the pad pins, the pads can be easily taken out through the opening of the caliper for replacement without the need for removing the caliper itself.

Ordinary disc brakes have a hydraulic piston received in a cylinder formed in the caliper. A pad pressing mechanism including this piston, which is used to press at least one of the pads, urges the opposed pair of pads into frictional contact with the disc. When the braking pressure is removed, a piston retracting means (typically a piston seal) forcibly retracts the piston by a predetermined distance.

If the pads remain in frictional contact with the disc even after the piston has been retracted, the pads will be dragged by the rotating disc, causing various troubles such as uneven wear of the pads and the disc, squealing of the brake, juddering resulting from uneven thickness of the disc, energy loss and shortened life of the brake. Various proposals have been made to forcibly retract the pads together with the piston and separate the pads from the disc when the brake pressure is removed.

For example, Unexamined Japanese Utility Model Publication 61-24545 proposes to provide the backing plate of a pad with a retainer resiliently pressed against the inner wall of the piston to transmit the piston retracting force to the pad through the retainer. Unexamined Japanese Utility Model Publication 5-45264 proposes to provide, at the rear of the pads, a gate-shaped plate retainer straddling the piston so as to engage in a groove formed in the outer periphery of the piston near its front end. It has a tongue extending from the back of the backing plate of the pad to its front and engaging the front surface of the backing plate to mechanically couple the piston and the pad together.

The retainer (or claw) disclosed in Unexamined Japanese Utility Model Publication 61-24545 is resiliently pressed against the inner surface of the piston to transmit force using the frictional resistance therebetween. Thus, if the frictional resistance of the pad is large, the retainer may slip relative to the pad, making it difficult for the pad to retract following the piston. The pad is thus likely to be dragged by the disc. Also, since the retainer, which is integral with the pad, is inserted in the piston, it is impossible to pull out the pad if the clearance between the pad and the disc is smaller than the length of the portion of the retainer inserted in the piston. Such a large clearance is, however, formed only after the pad has been fully worn. Thus, in order to replace the pad with a new one, the caliper has to be removed because no sufficiently large clearance is present between the pad and the disc while the pad is brand-new and not worn. It is troublesome to replace pads by removing the caliper.

The retainer disclosed in Unexamined Japanese Utility Model Publication 5-45264 is not received in the piston, so that it will not be an obstacle in pulling out the pad. Replacement of pads is thus easy. But in this arrangement, the tongue of the retainer, which transmits retracting force to the pad, is provided to embrace only the edge of the pad at the radially inner side of the disc. The pad is not coupled to the piston at its edge on the radially outer side of the disc, where sliding resistance is produced between the pad and the pad pins. This makes it difficult for the pad to follow the retracting piston at its radially outer edge. Thus, the pad inclines, with its radially outer portion kept in frictional contact with and dragged by the disc.

Further, since the tongue has no resilience, it cannot press the shim closely against the pad. Thus, play may be formed between the shim and the pad due to any slight machining errors. If play is present therebetween, the pad cannot retract together with the piston until the play disappears. This results in the pad being retracted insufficiently not only on the radially outer side of the disc but also on the radially inner side of the disc. Also, in the arrangement disclosed in Unexamined Utility Model Publication 5-45264, since the gate-shaped retainer (21 in FIG. 9) is not restricted by the piston 4, the tips of its legs 22 provided with the tongues 23 tend to be bent resiliently, and there is play between the piston 4 and the gate-shaped retainer 21, so that the pad might remain in sliding contact with the disc when the brake is released even if no play is present between the shim and the pad.

SUMMARY OF THE INVENTION

An object of the present invention is to provide a disc brake which can prevent the pads from being dragged by the disc while the brake is not applied by improving the ability of the pads to follow the pistons, and which permits easy replacement of the pads.

According to this invention, there is provided an open-top disc brake comprising a disc. A caliper is formed with cylinders and an opening, and a pair of friction pads having a backing plate are provided opposite to each other on both sides of the disc and hung from pad pins laterally extending in the opening. Pistons are received in the cylinders formed in the caliper for pressing the friction pads into frictional contact with the disc. A piston retracting means retracts the pistons when the pressure in the cylinders is removed, and shims are provided between the pistons and the friction pads. Each shim has first claws in engagement with engaging portions provided on the pistons for transmitting a piston retracting force to each shim, and second claws having a resilience and extending from the back of the backing plate of each pad to its front along its edges except its edge on the radially outer side of the disc, and is adapted to be pressed against the front face of the backing plate.

The first claws may be brought into engagement with each piston either on its inner or outer periphery. If they are engaged with the piston outer periphery, they are engaged in a boot-receiving groove formed in the outer periphery of the piston near its front end. If they are engaged with the piston inner periphery, they are brought into engagement with a recess or a small-diameter portion formed on the inner periphery of the piston.

The disc brake may be further provided with clips having holes for passing the pad pins and detachably fitted on the backing plate of each pad and each shim along their edges on the radially outer side of the disc to couple each backing plate and each shim together by sandwiching them from both sides. The clips may be provided with spring pieces that bear on the pad pins to urge the backing plate of each pad in a tangential direction of the disc or in a radially inward direction of the disc.

The piston retracting force is transmitted to the shims through the first claws and then from the shims to the pads through the second claws.

The first claws are not simply pressed against the piston but engaged in engaging portions in the form of shoulders formed on the pistons, so that it is possible to reliably transmit force from the pistons to the shims. Since the shims are in contact with the backing plates of the pads, it is possible to engage the second claws with the backing plates not only along their edges on the radially inner side of the disc but along their edges at both ends with respect to the circumferential direction of the disc. Also, since the second claws are pressed against the front face of the pad backing plate by their own resilience, there is no play between the pad and the shims, so that no loss occurs in transmitting the force. Thus the pulling force from the shims is applied to the pads on their radially outer portions as well. Thus, even if sliding resistance is applied unevenly to the pads due to contact with a torque-carrying surface or with the pad pins, the pads can be separated substantially entirely from the disc.

Since the pads are coupled to the pistons through the shims and the second claws are not present on the radially outer side of the disc, the pads can be pulled out in the radially outward direction of the disc by removing the pad pins even if a sufficiently large clearance is not present between the pads and the disc. Thus, the pads can be easily replaced.

The shims prevent squealing of the brake as well. Thus, the shims make it unnecessary to provide separate shims used exclusively to prevent brake squealing. Manufacturing cost is thus low.

The first claws brought into engagement with the inner surface of each piston needs little limitation in mounting space, so that they can be provided practically at any location. The small-diameter portion formed on the inner periphery of each piston by drawing for engaging the first claws is advantageous over the recess for engaging the first claws because drawing is easier than cutting.

The clips fitted on the pads on the radially outer side of the disc prevent the shims from separating from the backing plates of the pads at their portions on the radially outer side of the disc due to the pulling force of the pistons (this impairs the followability of the pads). Also, the shims eliminate the necessity to provide second claws along the ends of the pads with respect to the tangential direction of the disc, thereby obviating detrimental effects of such second claws.

By providing the clips with spring pieces, the pads are pressed against the pad pins or a torque-carrying surface by the force of the spring pieces. It is thus possible to prevent rattling and clonking noise.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1A:
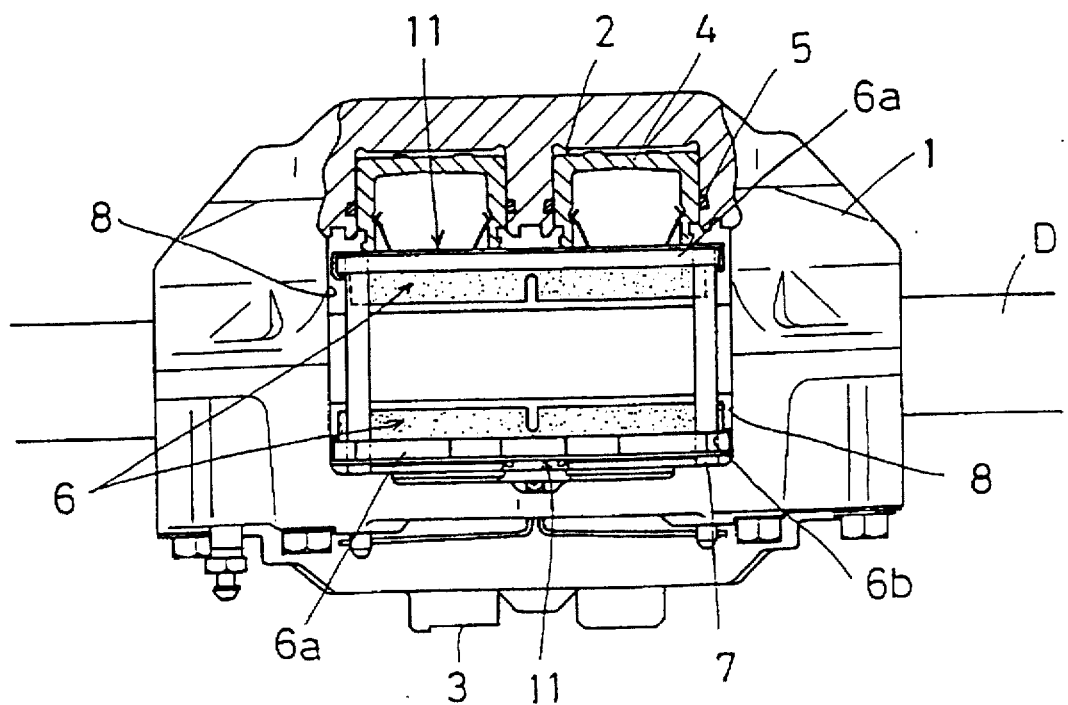
FIG. 1A is a partially cutaway plan view of an embodiment of the present invention.

FIG. 1 shows a disc brake with oppositely arranged pistons to which the concept of the present invention is applied. This disc brake has a caliper 1 formed with cylinders 2 communicating with fluid pressure introducing holes 3, and pistons 4 received in the respective cylinders 2. The outer periphery of each piston is liquid-tightly sealed by a piston seal 5, which enabled each piston to be retracted and defines a piston retracting means.

Friction pads 6 are provided on both sides of a disc D, opposite to each other. They are slidably supported on pad pins 7 laterally mounted in a window-like hole formed in the caliper 1 so as to be slidable in the axial direction of the disc by inserting the pins 7 in pin holes 6b formed in a backing plate 6a of each pad 6. When the pads 6 are pushed by the pistons 4 into frictional contact with the disc D, braking torque from the pads 6 is carried on one of two torque-carrying surfaces 8 of the caliper, so that braking force is applied to a wheel to which the disc D is fixed.

Figure 1B:
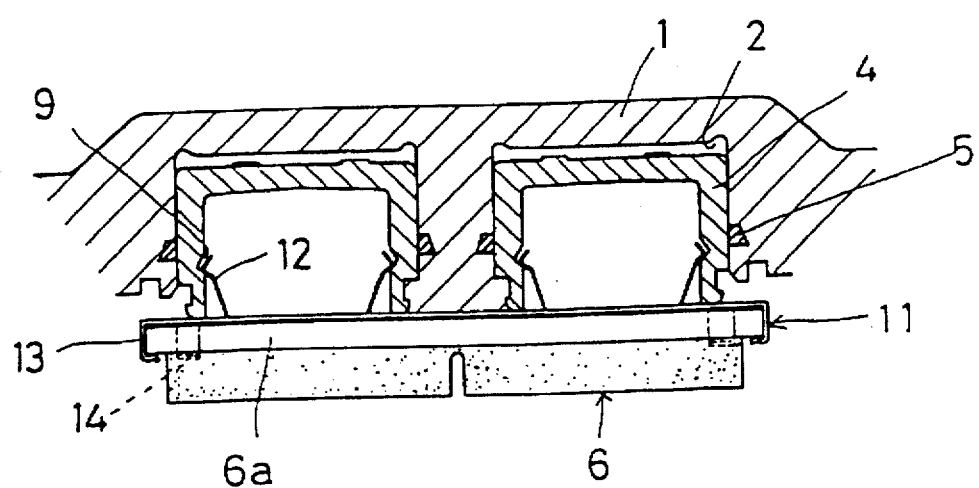
FIG. 1B is an enlarged view of a cutaway portion of FIG. 1A.

Shims 11 are provided between the pads 6 and the pistons 4. Each shim 11 has a plurality of first claws 12 inserted in the pistons 4 so as to engage in grooves 9 formed on the inner surfaces of the pistons (as shown in FIG. 1B), and two kinds of second claws, i.e. claws 13 extending from the back of the backing plate 6a of the pad 6 to its front while embracing its faces at both ends with respect to the tangential direction of the disc and engaging the front side of the backing plate 6a and claws 14 extending from the back of the backing plate 6a of the pad 6 to its front while embracing its inner edge, i.e. the edge nearer to the center of the disc and engaging the front side of backing plate 6a. Further, each shim 11 has holes 15 for passing the pad pins 7 (FIG. 2).

The resilient second claws 13 and 14 are pressed against the front face of the backing plate of the pad by their own spring force. Thus, no play is formed between the shim and the pad, so that the pad can move precisely, following the movement of the piston. Also, such resilient claws can absorb shocks sufficiently, so that they are less likely to suffer permanent deformation even if subjected to a large external force. The claws can thus stably perform expected functions.

Figure 2:
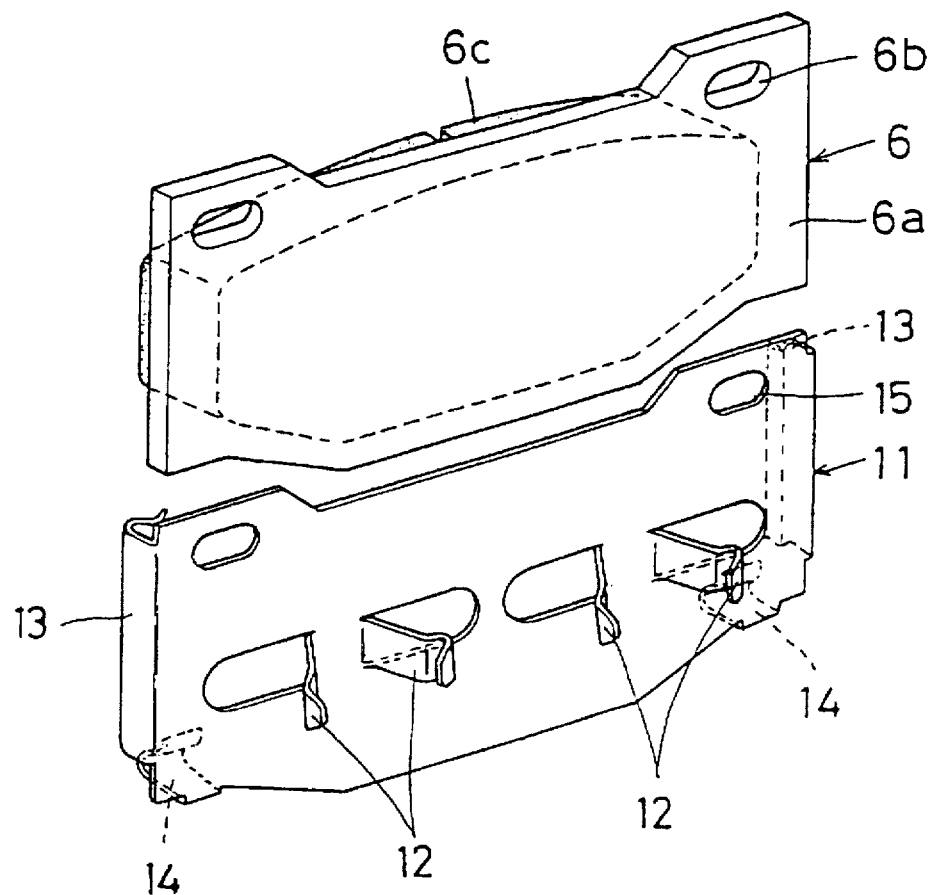
FIG. 2 is a perspective view of a pad and a shim of a brake of FIG. 1.
Figure 3:
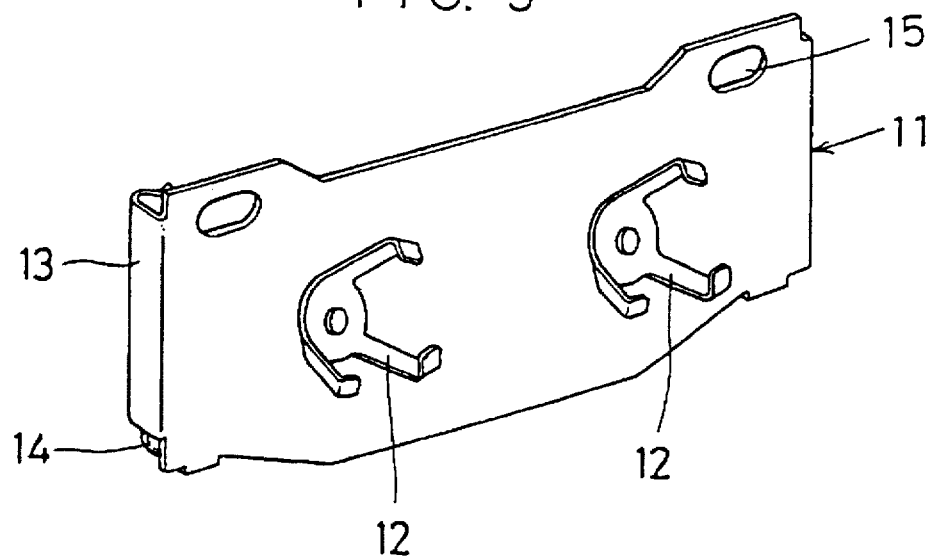
FIG. 3 is a perspective view of a shim of a different type.

The first claws 12 may be formed by cutting each shim 11 and raising the tab-like portions formed by cutting, as shown in FIG. 2. This arrangement has, however, a drawback in that holes are formed in the shim 11 by forming the claws 12. These holes may lower the rigidity of the shim and thus lower its flatness to an unacceptable level. If high rigidity is desired, separate claws 12 may be secured to the shim by caulking, welding or any other means, as shown in FIG. 3.

Figure 4:
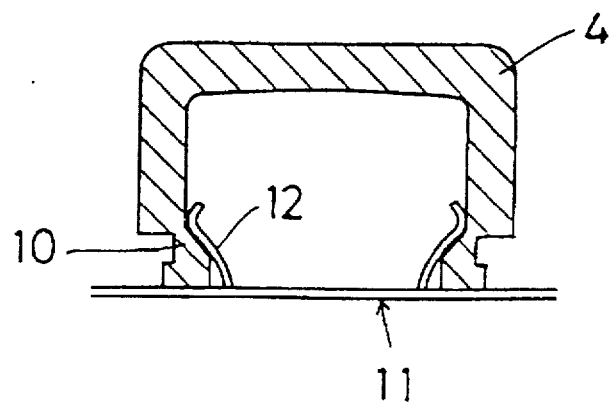
FIG. 4 is a sectional view of a piston of a different type.

In the arrangement of FIG. 1, the first claws 12 are engaged on grooves 9 formed in the inner surfaces of the pistons 4. But instead, as shown in FIG. 4, each piston 4 may be provided with a small-diameter portion 10 near its opening to form a shoulder on its inner surface for engaging the claws 12. This arrangement makes it unnecessary to cut the inner surface of the piston 4 to form the groove 9.

Figure 5:
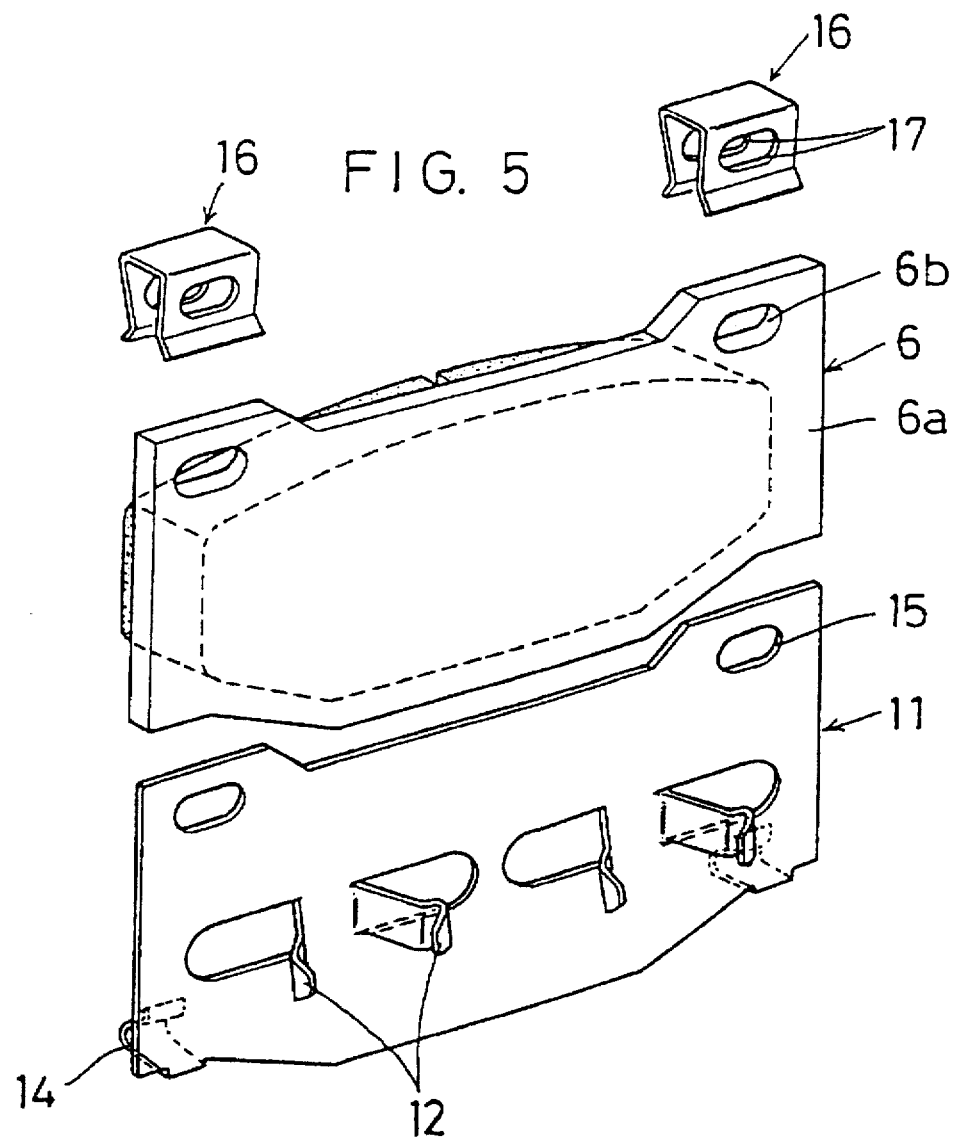
FIG. 5 is a perspective view of the pad and the shim with clips added.

In the embodiment shown in FIG. 5, clips 16 formed by bending a spring plate into a U-shape and having pin holes 17 are fitted on the shim 11 and the backing plate 6a to couple them together by sandwiching them from both sides. They are fitted so that their pin holes 17 will align with the pin holes 6b and 15 of the backing plate 6a and the shim 11, respectively. Since the pad pins 7 shown in FIG. 1 are passed through the pin holes 6b, 15 and 17, the clips 16 will never come off.

Figure 6:
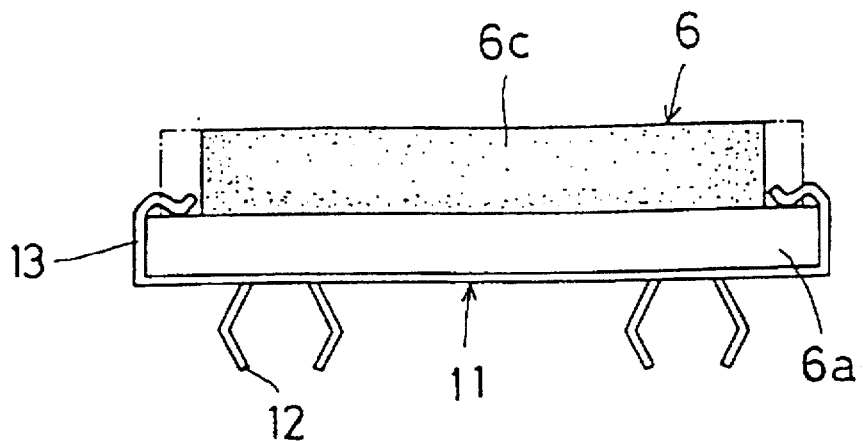
FIG. 6 is a view illustrating how a area of the friction member decreases by providing second claws.

The clips 16 offer the following advantages. By providing the claws 13, the friction member 6c of the pad has to be partially removed as shown by chain line in FIG. 6 to provide spaces that permit the claws 13 to engage the backing plate 6a. Thus, for higher braking performance, the claws 13 should be omitted. In this embodiment, it is possible to omit the claws 13 by providing the clips 16, so that the frictional surface remains large.

Figure 7:
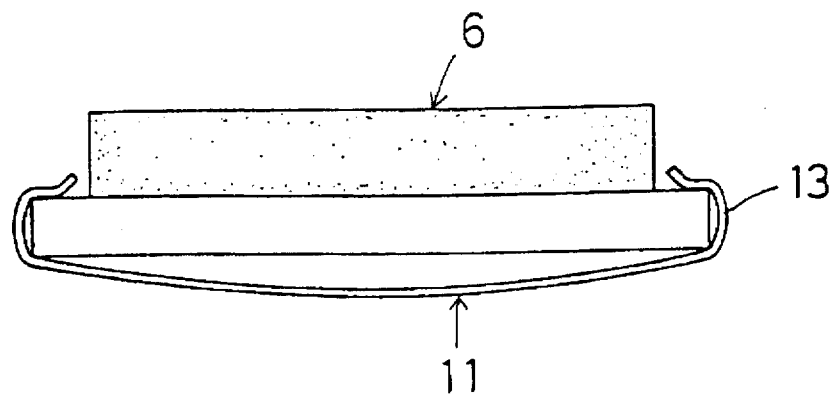
FIG. 7 is a plan view showing how the shim is deflected along its edge on the radially outer side of a disc.

In the arrangement of FIG. 1, when the shim 11 is pulled by the pistons 4, it may separate from the pad backing plate 6a along its outer edge as shown in FIG. 7. If this happens, the pad 6 cannot retract following the pistons in a stable manner. The clips 16 eliminate this problem.

Figure 8A:
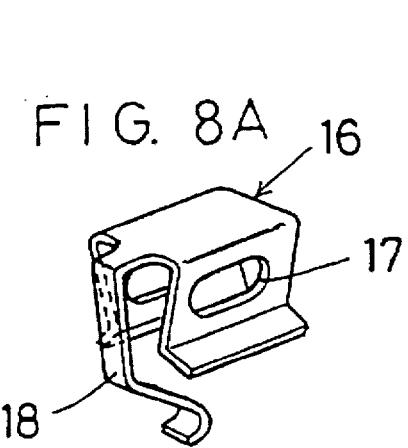
FIG. 8A is a perspective view of a clip having a resilient piece.
Figure 8B:
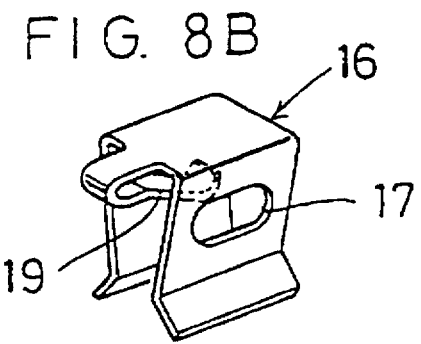
FIG. 8B is perspective view of another clip with a resilient piece.
Figure 9:
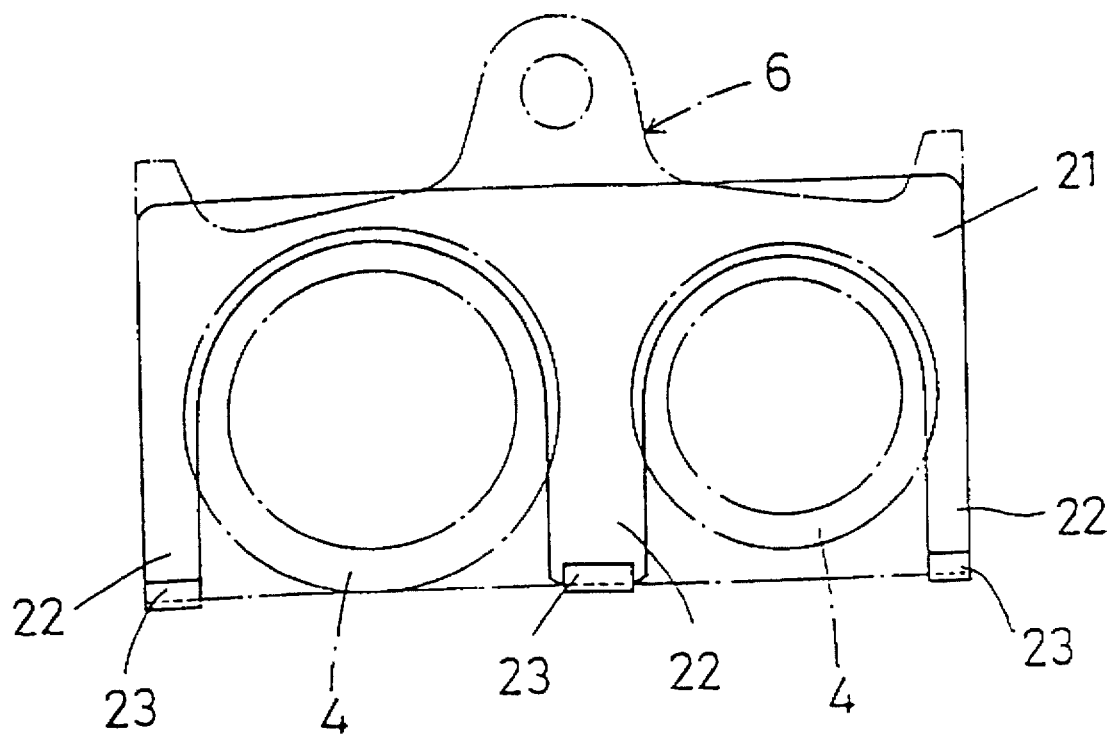
FIG. 9 is a front view of a conventional retainer with a tongue.

FIGS. 8A and 8B show clips having spring pieces. The spring piece 18 shown in FIG. 8A bears on the pad pin passing through the pin holes 17 to urge the backing plate 6a in the tangential direction of the disc (preferably from the disc leading side of the pad toward its disc trailing side). The pad 6 is thus pressed against one of the torque-carrying surfaces of the caliper.

The spring piece 19 shown in FIG. 8B bears on the pad pin to urge the pad 6 radially inwardly with respect to the disc, thereby eliminating any play between the pad and the pad pin. One of the clips may be provided with both spring pieces 18 and 19. They can effectively suppress rattling noise while the car is traveling and clonking noise at the beginning of braking by restricting the movement of the pads.

What is claimed is:

1. A disc brake, comprising:
    a disc having a radially outer side;
    a caliper having cylinders and an opening;
    a pair of friction pads each having a backing plate and disposed opposite to each other on opposite sides of said disc, said pair of friction pads being hung from pad pins extending laterally in said opening, and each said backing plate having a back facing said cylinders, edges, and a front facing said disc, said front having a front face;
    pistons received in said cylinders for pressing said friction pads into frictional contact with said disc, said pistons comprising engaging portions thereon;
    piston retracting means for enabling said pistons to be retracted upon a removal of fluid pressure in said cylinders; and
    shims provided between said pistons and said friction pads, each said shim having first claws in engagement with said engaging portions of respective said pistons so that a piston retracting force can be transmitted from said pistons to each said shim and said shim having resilient second claws extending from said back of said backing plate of a respective said pad to said front of said backing plate along the edges of said backing plate so that said second claws engage and press against said front face of said front of said backing plate;
    wherein said backing plate of a respective said pad is free from said second claws along one of the edges thereof located at said radially outer side of said disc.

2. The disc brake of claim 1, wherein each said piston is a cup-shaped member having an inner peripheral surface that is formed with a reduced diameter portion defining a said engaging portion.

3. The disc brake of claim 2, and further comprising clips that have holes therein with said pins passing there through, said clips being detachably mounted on said backing plate of each said pad and each said shim along edges thereof located at said radially outer side of said disc, said clips coupling each said backing plate with a respective said shim by sandwiching each said backing plate with its respective said shim together.

4. The disc brake of claim 3, wherein said clips comprise spring pieces such that said clips bear against said pins so as to bias a respective said backing plate in a tangential direction with respect to said disc.

5. The disc brake of claim 3, wherein said clips comprise spring pieces such that said clips bear against said pins so as to bias a respective said backing plate in a radially inward direction with respect to said disc.

6. The disc brake of claim 1, and further comprising clips that have holes therein with said pins passing there through, said clips being detachably mounted on said backing plate of each said pad and each said shim along edges thereof located at said radially outer side of said disc, said clips coupling each said backing plate with a respective said shim by sandwiching each said backing plate with its respective said shim together.

7. The disc brake of claim 6, wherein said clips comprise spring pieces such that said clips bear against said pins so as to bias a respective said backing plate in a tangential direction with respect to said disc.

8. The disc brake of claim 6, wherein said clips comprise spring pieces such that said clips bear against said pins so as to bias a respective said backing plate in a radially inward direction with respect to said disc.

9. A disc brake, comprising:
    a caliper having at least one cylinder therein and defining an opening through which a disc can extend, said opening extending in a tangential direction and having radially inner and outer directions;
    a pair of friction pads each having a backing plate and disposed opposite to each other on opposite sides of said opening, said pair of friction pads being hung from pad pins extending laterally in said opening, and one of said backing plates of a respective one of said pair of friction pads having a back facing said at least one brake cylinder, edges, and a front having a front face facing toward the other of said pair of friction pads;
    a piston received in each of said at least one cylinder, said piston comprising an engaging portion thereon;
    a shim provided between said piston and the one of said backing plates of the respective one of said pair of friction pads, said shim having at least one first claw in engagement with said engaging portion of said piston and said shim having resilient second claws extending from said back of the one of said backing plates to said front of the one of said backing plates along said edges thereof so that said second claws engage and press against said front face of said front of said backing plate;

wherein said backing plate of a respective said pad is free from said second claws along one of the edges thereof located at said radially outer side of said caliper.

10. The disc brake of claim 9, wherein said shim and said first and second claws are fixed with respect to each other.

11. The disc brake of claim 10, wherein said shim and said first and second claws are part of a unitary one-piece member.

12. The disc brake of claim 10, wherein said first claws are mounted on a back surface of said shim.

13. The disc brake of claim 9, wherein said shim is mounted on said pins.

14. The disc brake of claim 9, and further comprising resilient clips each having an opening there through receiving said pins, said clips being mounted on said shim and said backing plate so as to engage a rear surface of said shim and the front face of said backing plate and press said shim and said backing plate against each other.

15. The disc brake of claim 14, wherein said resilient clips each comprise springs engaging said backing plate and biasing said backing plate relative to said pins.

16. The disc brake of claim 9, wherein said second claws comprise claws on a bottom edge of said shim.

17. The disc brake of claim 16, wherein said second claws further comprises claws on side edges of said shim.

18. The disc brake of claim 9, wherein each of said at least one cylinder comprises a seal sealing around the respective said piston to allow the respective said piston to be retracted in the respective said brake cylinder upon a reduction in fluid pressure in said cylinder.

* * * * *